United States Patent
Lee et al.

(10) Patent No.: US 11,341,183 B2
(45) Date of Patent: May 24, 2022

(54) APPARATUS AND METHOD FOR SEARCHING FOR BUILDING BASED ON IMAGE AND METHOD OF CONSTRUCTING BUILDING SEARCH DATABASE FOR IMAGE-BASED BUILDING SEARCH

(71) Applicant: ELECTRONICS AND TELECOMMUNICATIONS RESEARCH INSTITUTE, Daejeon (KR)

(72) Inventors: Keun Dong Lee, Daejeon (KR); Seung Jae Lee, Daejeon (KR); Jong Gook Ko, Daejeon (KR); Hyung Kwan Son, Daejeon (KR); Weon Geun Oh, Daejeon (KR); Da Un Jung, Goyang-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 596 days.

(21) Appl. No.: 16/246,707

(22) Filed: Jan. 14, 2019

(65) Prior Publication Data

US 2019/0332625 A1 Oct. 31, 2019

(30) Foreign Application Priority Data

Apr. 26, 2018 (KR) .................. 10-2018-0048387

(51) Int. Cl.
*G06F 16/532* (2019.01)
*G06K 9/00* (2022.01)
(Continued)

(52) U.S. Cl.
CPC ............ *G06F 16/532* (2019.01); *G06F 16/51* (2019.01); *G06F 16/5854* (2019.01);
(Continued)

(58) Field of Classification Search
CPC .... G06F 16/532; G06F 16/5854; G06F 16/51; G06K 9/00637; G06K 9/46; G06K 9/6202
(Continued)

(56) References Cited

U.S. PATENT DOCUMENTS 6,757,422 B1 * 6/2004 Suzuki ............... G06T 7/74
                                                    382/154
7,421,101 B2 * 9/2008 Georgescu ............... G06T 7/20
                                                    382/103
(Continued)

FOREIGN PATENT DOCUMENTS

KR      2011-0085728 A    7/2011
KR      2016-0128869 A   11/2016
KR       10-1742115 B1    5/2017

OTHER PUBLICATIONS

Marco Cavallo, "3D City Reconstruction From Google Street View", Comput. Graph. J (2015).
(Continued)

*Primary Examiner* — Mark E Hershley
(74) *Attorney, Agent, or Firm* — LRK Patent Law Firm

(57) ABSTRACT

An apparatus and method for searching for a building on the basis of an image and a method of constructing a building search database (DB) for image-based building search. The method includes constructing a building search DB, receiving a query image from a user terminal, detecting a region to which a building belongs in the query image, extracting features of the region detected in the query image, and searching the building search DB for a building matching the extracted features. Therefore, building search performance can be improved.

18 Claims, 11 Drawing Sheets

(51) Int. Cl.
   *G06F 16/51* (2019.01)
   *G06K 9/62* (2022.01)
   *G06F 16/583* (2019.01)
   *G06K 9/46* (2006.01)

(52) U.S. Cl.
   CPC .......... *G06K 9/00637* (2013.01); *G06K 9/46* (2013.01); *G06K 9/6202* (2013.01)

(58) Field of Classification Search
   USPC .......................................................... 707/741
   See application file for complete search history.

(56) References Cited

U.S. PATENT DOCUMENTS

| | | | | |
|---|---|---|---|---|
| 8,180,146 | B2* | 5/2012 | Ngan | G06K 9/00704 |
| | | | | 382/159 |
| 8,605,947 | B2* | 12/2013 | Zhang | G08G 1/167 |
| | | | | 382/104 |
| 8,625,890 | B1* | 1/2014 | Brenner | 382/165 |
| 8,666,112 | B1* | 3/2014 | Jing | G06F 16/583 |
| | | | | 382/100 |
| 8,830,312 | B2* | 9/2014 | Hummel | G06K 9/00375 |
| | | | | 348/77 |
| 10,186,049 | B1* | 1/2019 | Boardman | G06T 7/75 |
| 10,289,911 | B2* | 5/2019 | Liu | G06K 9/4604 |
| 2002/0050988 | A1* | 5/2002 | Petrov | G06K 9/20 |
| | | | | 345/418 |
| 2003/0012425 | A1* | 1/2003 | Suzuki | H04N 13/371 |
| | | | | 382/154 |
| 2007/0179918 | A1* | 8/2007 | Heisele | G06K 9/6219 |
| | | | | 706/13 |
| 2008/0263012 | A1* | 10/2008 | Jones | G09C 1/00 |
| 2011/0150324 | A1* | 6/2011 | Ngan | G06K 9/4671 |
| | | | | 382/159 |
| 2011/0310087 | A1* | 12/2011 | Wright, Jr. | G06T 19/003 |
| | | | | 345/419 |
| 2014/0037198 | A1* | 2/2014 | Larlus-Larrondo | G06T 7/162 |
| | | | | 382/159 |
| 2014/0347475 | A1* | 11/2014 | Divakaran | G06K 9/00771 |
| | | | | 348/135 |
| 2015/0356357 | A1* | 12/2015 | McManus | G06T 7/254 |
| | | | | 382/104 |
| 2016/0125252 | A1* | 5/2016 | Harada | G06K 9/50 |
| | | | | 382/103 |
| 2016/0267347 | A1 | 9/2016 | Cho et al. | |
| 2016/0364912 | A1 | 12/2016 | Cho et al. | |
| 2017/0076142 | A1* | 3/2017 | Chang | G06K 9/627 |
| 2017/0098054 | A1* | 4/2017 | Hayward | G06Q 50/163 |
| 2018/0165519 | A1* | 6/2018 | Wnuk | G06K 9/6202 |
| 2018/0260626 | A1* | 9/2018 | Pestun | G08G 5/0086 |
| 2018/0267603 | A1* | 9/2018 | Bastian | G06F 3/011 |
| 2019/0080456 | A1* | 3/2019 | Song | G06T 7/174 |

OTHER PUBLICATIONS

Akihiko Torii et al., "24/7 Place Recognition by View Synthesis", Proceedings of the IEEE Conference on Computer Vision and Pattern Recognition. 2015.

Shaoqing Ren et al., "Faster R-CNN: Towards real-time object detection with region proposal networks", Advances in neural information processing systems. 2015.

Wei Liu et al., "SSD: Single Shot MultiBox Detector", arXiv:1512.02325v5 [cs.CV] Dec. 29, 2016.

Kaiming He et al., "Mask R-CNN", arXiv:1703.06870v3 [cs.CV] Jan. 24, 2018.

David G. Lowe, "Distinctive Image Features from Scale-Invariant Keypoints", Accepted for publication in the International Journal of Computer Vision, 2004.

Herbert Bay et al., "SURF: Speeded Up Robust Features", European conference on computer vision. Springer, Berlin, Heidelberg, 2006.

\* cited by examiner

Max ratio = 0.20

Max ratio = 0.044

Max ratio = 0.095

APPARATUS AND METHOD FOR SEARCHING FOR BUILDING BASED ON IMAGE AND METHOD OF CONSTRUCTING BUILDING SEARCH DATABASE FOR IMAGE-BASED BUILDING SEARCH

CROSS REFERENCE TO RELATED APPLICATION

This application claims priority to Korean Patent Application No. 10-2018-0048387, filed on Apr. 26, 2018 in the Korean Intellectual Property Office (KIPO), the entire content of which is hereby incorporated by reference.

BACKGROUND

1. Field of the Invention

Example embodiments of the present invention relate to an apparatus and method for searching for a building on the basis of an image and a method of constructing a building search database (DB) for image-based building search, and more particularly, to an apparatus and method for receiving a query image, extracting visual features of a building included in the query image, searching for the building by comparing the extracted features with features of buildings stored in a search DB, which has been constructed through image refinement and the like, and providing information on the building.

2. Description of Related Art

Image-based building search services provide information on a building whose image is captured by a user. The image-based building search service is variously used in location-based services, tourism, the augmented reality (AR) industry, and the like.

Generally, an image DB of a search target region is constructed from street-view images due to easiness of image acquisition, and an image-based building search service is provided using the constructed image DB.

However, in many street-view images, several buildings are captured in one scene. Therefore, when a search is performed through image matching, ambiguity arises in determining which building was matched with a query in a retrieved image when multiple buildings are present. Also, when there are too many buildings in one image or many objects other than buildings are present, an error occurs in an image search.

To solve these problems, a method of constructing a search DB with only images of single buildings may be taken into consideration. However, the method requires excessive costs to acquire images and thus is inappropriate.

SUMMARY

Accordingly, example embodiments of the present invention are provided to substantially obviate one or more problems due to limitations and disadvantages of the related art.

Example embodiments of the present invention provide a method of searching for a building on the basis of an image.

The method of searching for a building based on an image may comprise constructing a building search database (DB); receiving a query image from a user terminal; detecting a region to which a building belongs in the query image; extracting features of the region detected in the query image; and searching the building search DB for a building matching the extracted features.

The detecting of the region to which the building belongs may comprise detecting or segmenting the region to which the building belongs using a building detection model, which is generated using acquired building images and building mask images as training images.

The constructing of the building search DB may comprise acquiring building images and building mask images; refining the building images by deleting images in which area ratios of buildings are smaller than a reference value; detecting keypoints in the refined images; extracting features of the detected keypoints; and storing the extracted features in correspondence with the building images and the building mask images.

The refining of the building images may comprise calculating an area ratio of each individual building included in each of the building images using the building mask images; comparing a maximum of calculated building-specific area ratios with a preset threshold value; and deleting a building image in which area ratios have been calculated when a comparison result indicates that a maximum is smaller than the threshold value.

The extracting of the features may comprise selecting keypoints overlapping the building mask images from among the detected keypoints; and extracting features of the selected keypoints.

The selecting of the keypoints may comprise selecting keypoints whose surrounding regions overlap the building mask images from among the detected keypoints.

The extracting of the features may comprise classifying the selected keypoints according to individual buildings and extracting features according to the individual buildings.

The selecting of the keypoints may comprise an operation of selecting buildings whose area ratios in the building images exceed a preset threshold value; and an operation of selecting keypoints whose surrounding regions overlap regions of the selected buildings in the building mask images.

Example embodiments of the present invention also provide a method of constructing a building search database (DB) for image-based building search.

The method of constructing a building search database (DB) for image-based building search may comprise acquiring building images and building mask images; refining the building images by deleting building images in which an area ratio of buildings is smaller than a reference value; detecting keypoints in the refined images;
extracting features of the detected keypoints; and storing the extracted features in correspondence with the building images and the building mask images.

The refining of the building images may comprise calculating an area ratio of each individual building included in each of the building images using the building mask images; comparing a maximum of the calculated area ratios of buildings with a preset threshold value; and deleting the building image in which area ratios have been calculated when a comparison result indicates that the maximum is smaller than the threshold value.

The extracting of the features may comprise selecting keypoints overlapping the building mask images from among the detected keypoints; and extracting features of the selected keypoints.

The selecting of the keypoints may comprise selecting keypoints whose surrounding regions overlap the building mask images from among the detected keypoints.

The extracting of the features may comprise classifying the selected keypoints according to individual buildings and extracting features according to the individual buildings.

The selecting of the keypoints may comprise selecting buildings whose area ratios in the building images exceed a preset threshold value; and selecting keypoints whose surrounding regions overlap regions of the selected buildings in the building mask images.

Example embodiments of the present invention also provide an apparatus for searching for a building on the basis of an image.

The apparatus for searching for a building based on an image may comprise at least one processor; and a memory configured to store instructions for instructing the at least one processor to perform at least one operation.

The at least one operation may comprise constructing a building search database (DB); receiving a query image from a user terminal; detecting a region to which a building belongs in the query image; extracting features of the region detected in the query image; and searching the building search DB for a building matching the extracted features.

The detecting of the region to which the building belongs may comprise detecting or segmenting the region to which the building belongs using a building detection model, which is generated using acquired building images and building mask images as training images.

The constructing of the building search DB may comprise acquiring building images and building mask images; refining the building images by deleting images in which area ratios of buildings are smaller than a reference value; detecting keypoints in the refined images; extracting features of the detected keypoints; and storing the extracted features in correspondence with the building images and the building mask images.

The refining of the building images may comprise calculating an area ratio of each individual building included in each of the building images using the building mask images; comparing a maximum of the calculated area ratios of buildings with a preset threshold value; and deleting the building image in which area ratios have been calculated when a comparison result indicates that the maximum is smaller than the threshold value.

The extracting of the features may comprise selecting keypoints overlapping the building mask images from among the detected keypoints; and extracting features of the selected keypoints.

The selecting of the keypoints may comprise selecting keypoints whose surrounding regions overlap the building mask images from among the detected keypoints.

Some example embodiments provide a method of searching for a building on the basis of an image.

Other example embodiments provide a method of constructing a building search DB for image-based building search.

Other example embodiments provide an apparatus for searching for a building on the basis of an image.

BRIEF DESCRIPTION OF DRAWINGS

Example embodiments of the present invention will become more apparent by describing in detail example embodiments of the present invention with reference to the accompanying drawings, in which.

DETAILED DESCRIPTION OF EXAMPLE EMBODIMENTS

Figure 1:
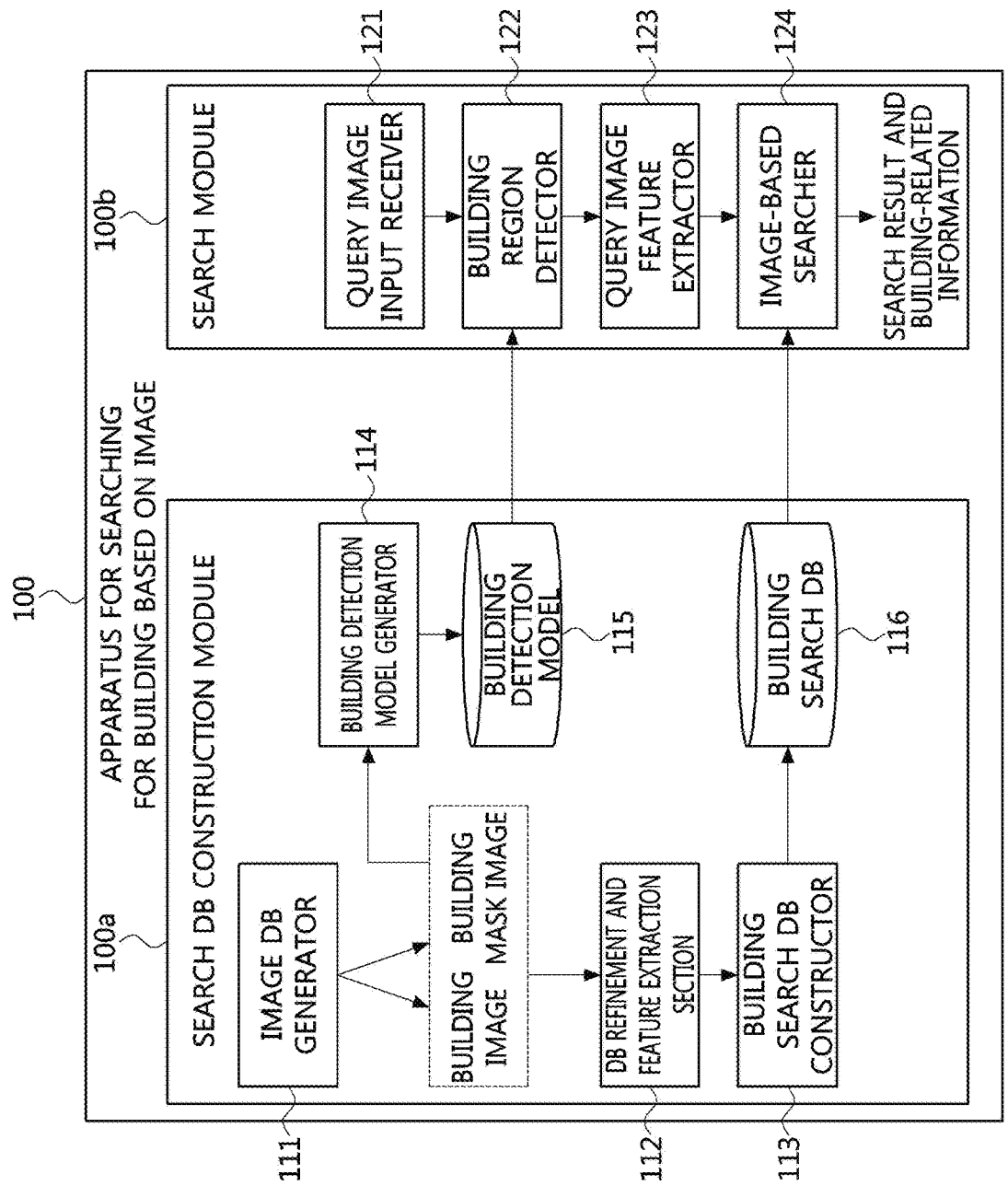
FIG. 1 is a block diagram showing functional modules of an apparatus for searching for a building on the basis of an image according to an example embodiment of the present invention.

Example embodiments of the present invention are disclosed herein. However, specific structural and functional details disclosed herein are merely representative for purposes of describing the example embodiments of the present invention, however, the example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.). The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In the present invention, colorants may be any substance including coloring and having a property of imparting color, may include both substances that have high opacity and are insoluble in water and substances that have high transparency and are soluble in water, and may be referred to as a pigment, a dye, or the like.

Hereinafter, exemplary embodiments of the present invention will be described in detail with reference to the accompanying drawings.

FIG. 1 is a block diagram showing functional modules of an apparatus for searching for a building on the basis of an image according to an example embodiment of the present invention.

Referring to FIG. 1, an apparatus 100 for searching for a building on the basis of an image may include a search database (DB) construction module 100a for constructing a DB 116 required for a building search (referred to as a building search DB), and a search module 100b for searching for a building using the constructed building search DB 116 and providing information related to the building to a user.

Here, the search DB construction module 100a may include an image DB generator 111, a DB refinement and feature extraction section 112, a building search DB constructor 113, and/or a building detection model generator 114.

The image DB generator 111 may collect image data using an external image DB and the like and generate and/or store building images and building mask images using the collected image data. The external image DB may be a search site which provides street-view images (e.g., Google, Daum, and Naver).

Specifically, Google Map (http://www.google.com/maps) provides panoramic images and depth maps of the panoramic images. Such a depth map may include a normal vector of each plane existing in the corresponding panoramic image, distance information from a camera, and/or pixel-specific indices of planes to which the corresponding pixels belong. Therefore, a perspective image may be generated at an angle according to certain intervals in yaw and pitch directions using a panoramic image and used as a building image of the present invention, and a mask image of the building may be generated using the generated perspective image and information obtained from a depth map (normal vectors, distances from a camera, and pixel-specific plane indices).

Also, some map service users may have constructed three-dimensional (3D) model information of search target regions in advance. In this case, it is possible to generate a building image and a building mask image using an image (or a panoramic image) and the 3D model information.

For a detailed method of acquiring a building image and a building mask image, it is recommended to refer to Cavallo, Marco. "3D City Reconstruction From Google Street View." Comput. Graph. J (2015) and Torii, Akihiko, et al. "24/7 Place Recognition by View Synthesis." Proceedings of the IEEE Conference on Computer Vision and Pattern Recognition (2015).

The DB refinement and feature extraction section 112 may delete an unnecessary building image which degrades search performance using the building images and the building mask images previously generated by the image DB generator 111, and extract feature information of buildings using the refined building images and building mask images.

The building search DB constructor 113 may generate the building search DB 116 which will be used for building search by storing the building feature information acquired through the DB refinement and feature extraction section 112 and the building images and/or the building mask images in correspondence with each other. Specifically, the building search DB constructor 113 may generate the building search DB 116 in which the building feature information and the building images and/or the building mask images are reconfigured in the form of data which is easily searched. For example, the building search DB 116 may include file names of images from which the building feature information has been extracted, building-specific feature information, building coordinates in images, and building-specific associated information. Here, the building coordinates in images may be coordinates of bounding boxes including the corresponding building regions in the building mask images. The building-specific associated information may be detailed building information collected regarding the corresponding buildings. For example, when a building is a restaurant, a menu, reviews, a discount coupon, etc. may be included, and when a building is a store, a store advertisement, sales items, selling prices, etc. may be included.

Also, place or location information at which building images have been captured may be acquired and indexed in the building search DB 116 so that place-based search may be supported. For example, when a user provides a query image captured at a specific location (or global positioning system (GPS) location information), the building search DB 116 may be searched for images within a margin of error based on the provided specific location.

The building detection model generator 114 may generate a building detection model 115 for detecting a building region in the query image input from the user who wants a building search. Specifically, the building detection model generator 114 may generate the building detection model 115 for detecting a region in which a building exists in a specific image using the building images and the building mask images previously generated by the image DB generator 111 as training images.

According to a first example of the building detection model 115, a building region (or a building position) in the query image may be detected in the form of coordinates of a bounding box. In this case, bounding boxes of buildings may be calculated using building mask images, and the first example of the building detection model 115 may be generated using building images and coordinates of the bounding boxes as training data. As a training method, a faster region-based convolutional neural network (R-CNN) (Shaoqing Ren et al., "Faster R-CNN: towards real-time object detection with region proposal networks", Advances in neural information processing systems, 2015) or a single shot multibox detector (SSD) ("Wei Liu et al., "SSD: Single Shot MultiBox Detector", arXiv:1512.02325, 2015) may be used.

According to a second example of the building detection model 115, a building region in the image may be segmented into pixels. In this case, the second example of the building detection model 115 may be generated using building images previously obtained through the image DB generator 111 and mask images corresponding thereto as training data. As a training method, a mask R-CNN (Kaiming He et al., "Mask R-CNN", IEEE Int. Conf. on Comp. Vision, 2017) may be used.

Meanwhile, the search module 100b may receive a query image, a query word, and/or the like for a search from a user, search the building search DB 116, which has been constructed by the search DB construction module 100a, for a building corresponding to the query image and/or the query word, and provide an image of the searched building and building-related information to the user.

Specifically, a query image input receiver 121 may receive an image of a building which will be searched for, a name of the building, a location of the building, etc. from the user. When the name, location, etc. of the building are received, an image of the building or information related to the building may be immediately provided to the user with reference to names, locations, etc. stored in the building search DB 116.

Meanwhile, when an image of the building (referred to as a query image below) is input from the user, a building region detector 122 may detect a building region included in the query image using the building detection model 115 generated by the search DB construction module 100a. Specifically, a bounding box of a region in which the building exists may be generated in the query image using the detection method of the building detection model 115. Also, a mask image of the building may be generated in the query image using the segmentation method of the building detection model 115.

A query image feature extractor 123 may extract features of the building region detected by the building region detector 122. When a plurality of building regions are detected by the building region detector 122, features of the plurality of building regions may be extracted.

An image-based searcher 124 may search the building-specific feature information stored in the building search DB 116 for a building having feature information which is very similar to the feature information extracted from the building region. It is possible to provide the user with building-related information indexed in the building search DB 116 regarding the searched building.

Also, when features of a plurality of building regions are extracted by the query image feature extractor 123, the image-based searcher 124 may search for feature information which is very similar to feature information of each individual building region. Therefore, the user may be provided with building-related information of all the plurality of buildings included in the query image.

Although it has been described that the search DB construction module 100a and the search module 100b are included in the apparatus 100 for searching for a building on the basis of an image, the present invention is not limited thereto. Each of the search DB construction module 100a and the search module 100b may be embodied into a hardware device including a processor and a memory. In this case, the hardware device of the search module 100b may collect and process data by accessing the building search DB 116 which is constructed separately therefrom.

Figure 2A:
FIG. 2A is a building image generated to construct a building search database (DB) according to an example embodiment of the present invention.
Figure 2B:
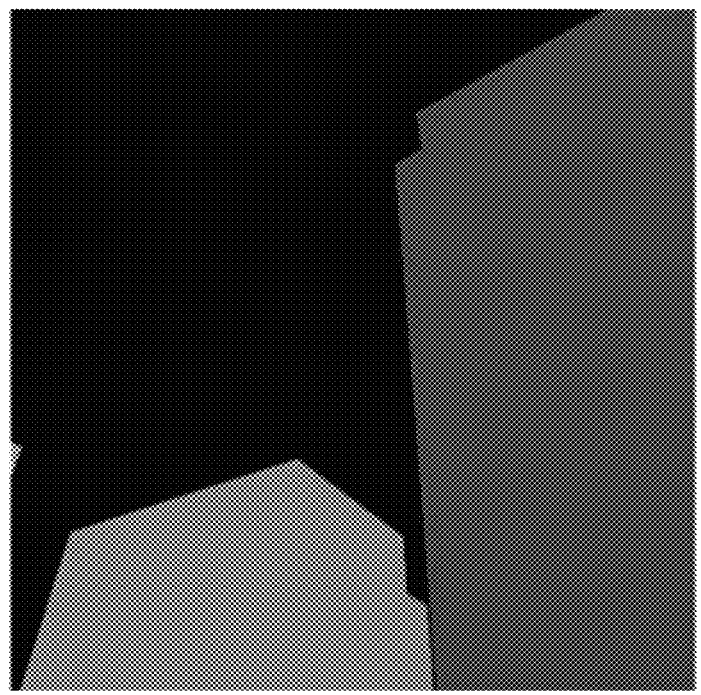
FIG. 2B is a building mask image generated to construct a building search DB according to an example embodiment of the present invention.

FIG. 2A is a building image generated to construct a building search DB according to an example embodiment of the present invention. FIG. 2B is a building mask image generated to construct a building search DB according to an example embodiment of the present invention.

To construct an image DB for building search according to an example embodiment of the present invention, building images and building mask images may be generated. Referring to FIG. 2A, it is possible to see a building image, which may be a perspective image generated at an angle according to certain intervals in yaw and pitch directions using a panoramic image.

Also, referring to FIG. 2B, it is possible to see a building mask image generated using information obtained from the generated perspective image and a depth map.

Figure 3:
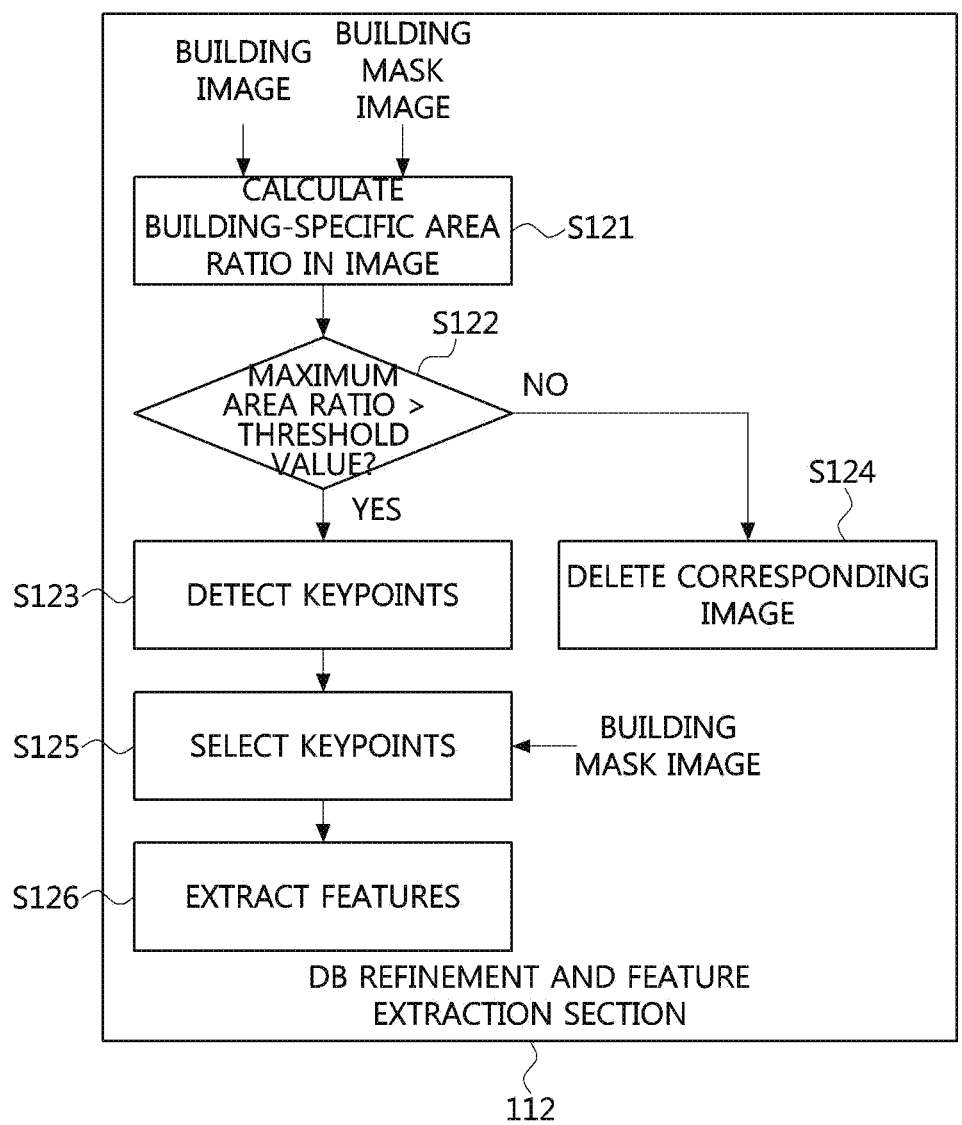
FIG. 3 is a flowchart of a method of constructing a building search DB by refining image data according to an example embodiment of the present invention.
Figure 4A:
FIGS. 4A to 4C are building images which are deleted in image data according to an example embodiment of the present invention.
Figure 4B:
Figure 4C:

FIG. 3 is a flowchart of a method of constructing a building search DB by refining image data according to an example embodiment of the present invention. FIGS. 4A to 4C are building images which are deleted in image data according to an example embodiment of the present invention.

As described above regarding the DB refinement and feature extraction section 112 of FIG. 1, a method of searching for a building on the basis of an image according to an example embodiment of the present invention includes a process of refining some image data of building images and building mask images and extracting feature information on the basis of the refined image data.

Referring to FIG. 3, in the process of refining image data and extracting features, an area ratio of each building in the building images may be calculated using the building mask images (S121). The area ratio may be calculated using Equation 1 below.

$$P(b_i) = \frac{\sum_{(0,0)}^{(W,H)} m(x, y, b_i)}{W \times H} \quad [\text{Equation 1}]$$

Referring to Equation 1, an area (e.g., the number of pixels of a mask image in the corresponding building) of each building $b_i$ (i is an index of each individual building) in a mask image B(x, y) of the corresponding building may be calculated on the basis of an area of a whole building image (e.g., the total number of pixels) which is a product of a horizontal length W and a vertical length H of the building image so that an area ratio $P(b_i)$ may be obtained.

An area of a specific building in a mask image may be calculated using Equation 2 below.

$$m(x, y, b_i) = \begin{cases} 1, & \text{if } B(x, y) = b_i \\ 0, & \text{otherwise.} \end{cases} \quad [\text{Equation 2}]$$

Referring to Equation 2 above, m(x, y, $b_i$) is a function which returns 1 when pixel values of the building mask image B(x, y) corresponding to coordinates (x, y) belong to the corresponding building $b_i$, and returns 0 otherwise.

Therefore, it is possible to calculate an area ratio of each individual building in the building images based on the building mask images by applying a function obtained according to Equation 2 to Equation 1.

After area ratios are calculated, it may be determined whether the maximum of the calculated area ratios of buildings exceeds a predefined threshold value (S122). In other words, a building having the largest area ratio may be determined from among a plurality of buildings included in each building image, and it may be determined whether the building occupies an area corresponding to the predefined threshold ratio value or more in the building image.

Therefore, when the maximum of the calculated area ratios of buildings does not exceed the predetermined threshold value, there are too many buildings in the building image, buildings are too small in the building image, or the sky, roads, etc. unrelated to buildings are included too much in the building image. In this case, the building image may be deleted (S124).

Referring to FIG. 4A, the building image corresponds to a case in which the maximum of area ratios of buildings in the image is 0.20, and it is difficult to specify any one building.

Referring to FIGS. 4B and 4C, the building images correspond to cases in which the maximum of area ratios of buildings in the image is 0.044 and 0.0985. In these images, unnecessary vehicles and streets are included too much.

Therefore, when the predefined threshold ratio value is set to 0.25, the building images of FIGS. 4A to 4C are deleted to prevent unnecessary degradation of search performance.

After some building images are deleted according to the threshold ratio value, keypoints of remaining building images may be detected (S123). As a method of detecting keypoints, it is possible to use a difference of Gaussian (DoG) detector (D. Lowe, "Distinctive image features from scale-invariant keypoints," Int. J. Comput. Vis., vol. 60, no. 2, pp. 91-110, 2004.), a fast-Hessian detector (Herbert Bay, "Speeded-Up Robust Features (SURF)," Computer Vision and Image Understanding 110 pp. 346-359, 2008), a Laplacian of Gaussian (LoG) detector, a Harris/Hessian-affine detector, or the like.

When keypoints of the building images are detected, keypoints existing in building mask regions may be selected from among the detected keypoints (S125). In other words, since the keypoints detected in the building images include keypoints of objects other than buildings, keypoints belonging to building mask regions are selected so that only keypoints of buildings may be selected.

When keypoints of buildings are selected, features of the selected keypoints may be extracted (S126). As a method of extracting features of keypoints, it is possible to use scale invariant feature transform (SIFT) "D. Lowe, "Distinctive image features from scale-invariant keypoints," Int. J. Comput. Vis., vol. 60, no. 2, pp. 91-110, 2004.) or SURF (Herbert Bay, "Speeded-Up Robust Features (SURF)," Computer Vision and Image Understanding 110 pp. 346-359, 2008). In other words, features are extracted not from all keypoints in building images but from only keypoints corresponding to buildings. Therefore, processing speed may be improved compared to that of a method of extracting all features from a building image and then selecting features of buildings.

FIGS. 5A to 5D are example diagrams illustrating a method of selecting keypoints of a building according to an example embodiment of the present invention.

Figure 5A:
FIGS. 5A to 5D are example diagrams illustrating a method of selecting keypoints of a building according to an example embodiment of the present invention.
Figure 5B:
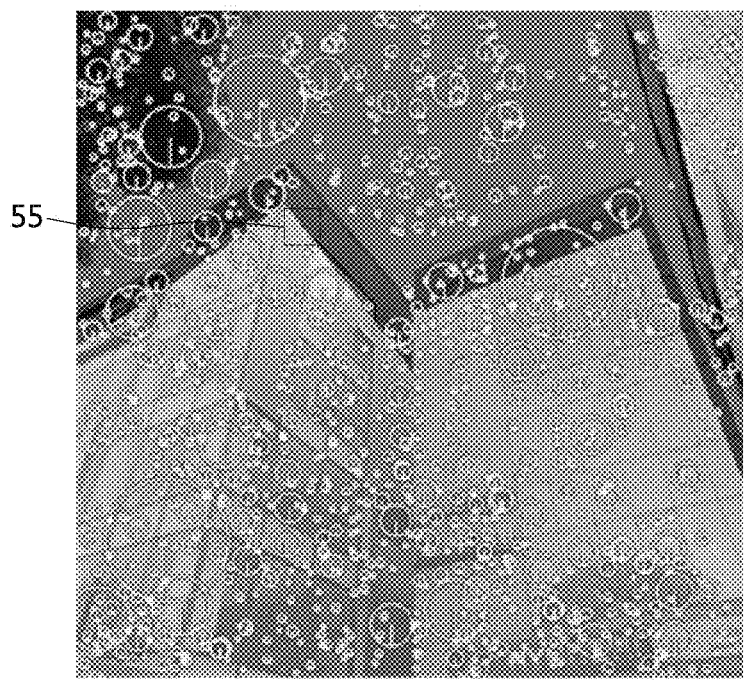

Referring to FIG. 5A, it is possible to see a building image to which the method of selecting keypoints will be applied. From the building image of FIG. 5A, keypoints may be extracted as shown in FIG. 5B. In FIG. 5B, it is possible to see that keypoints overlap a building mask image, and only the keypoints overlapping the building mask image may be considered as keypoints of buildings. Therefore, it is possible to select keypoints existing in the building mask image.

Even when keypoints exist in a building mask image, an area ratio of the corresponding building to the image may be small. In this case, search performance may be low. Therefore, only keypoints corresponding to a building whose area ratio is the predefined threshold value or more according to Equations 1 and 2 above may be selected from among the keypoints existing in the building mask image.

Meanwhile, it is possible to see that a building mask image does not exactly coincide with an actual building as indicated by a reference number 55 of FIG. 5B. Therefore, when only keypoints existing in the building mask image are selected, some of keypoints corresponding to the buildings may be lost. In consideration of such an error of the building mask image, according to an example embodiment of the present invention, when a partial region (e.g., an N×N region) in which keypoints previously extracted from the building image is centered overlaps the building mask image, the keypoints may be selected as a building keypoints.

Figure 5C:
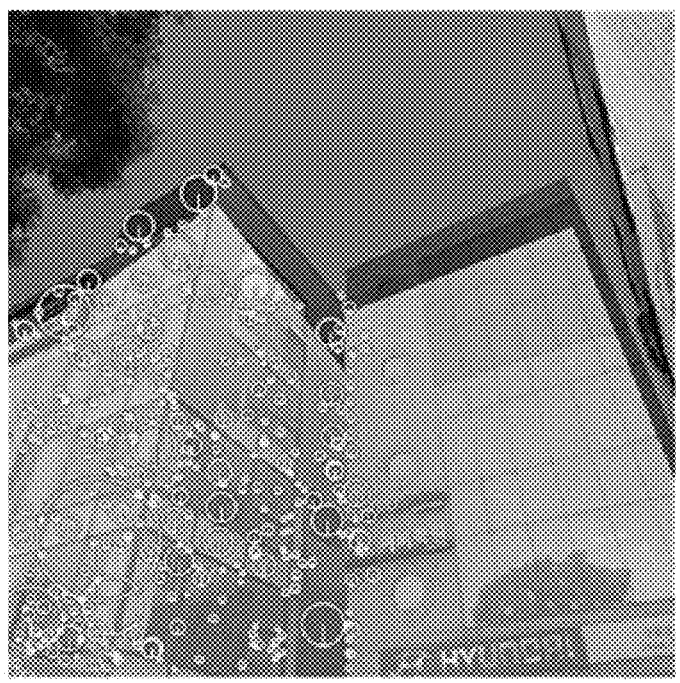
Figure 5D:
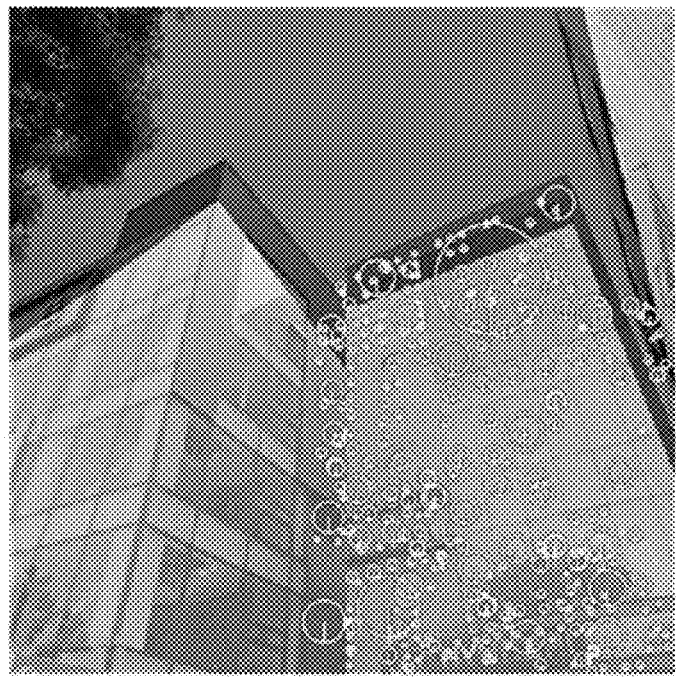

Also, according to an example embodiment of the present invention, the selected keypoints may be classified according to buildings and stored. Referring to FIGS. 5C and 5D, it is possible to determine whether a 30×30 pixel region in which each keypoint extracted from the building image is centered overlaps the building mask image and see keypoints selected as overlapping keypoints. Here, it is possible to see that keypoints have been selected according to buildings.

Like this, when keypoints are stored in a building search DB according to buildings, a search is performed on the basis of building-specific keypoints. Therefore, search speed may be reduced, but any one building may be directly obtained as a search result. On the other hand, when keypoints existing in building mask images constitute a building search DB, a building image having keypoints corresponding to a query image is searched for. Therefore, search speed may be increased, but it is additionally necessary to verify geometric relationships between keypoints and the like so as to determine which building is a building searched for in a searched building image. Consequently, search speed may be reduced when information related to the building is required.

Figure 6:
FIG. 6 shows an example of detecting regions in which buildings exist in a building search process according to an example embodiment of the present invention.

FIG. 6 shows an example of detecting regions in which buildings exist in a building search process according to an example embodiment of the present invention.

In a method of searching for a building on the basis of an image according to an example embodiment of the present invention, a building region may be detected in a query image, and then features may be extracted. Therefore, it is necessary to detect a building region in a query image, and the building detection model described above in FIG. 1 may be used at this time.

Referring to FIG. 6, it is possible to see that bounding boxes indicating regions in which buildings exist are generated in a query image using a building detection model which is generated using coordinates of bounding boxes extracted from building mask images and building images as training data.

Only building regions may be detected in the query image on the basis of the generated bounding boxes, and it is possible to detect keypoints in the detected building regions.

Figure 7:
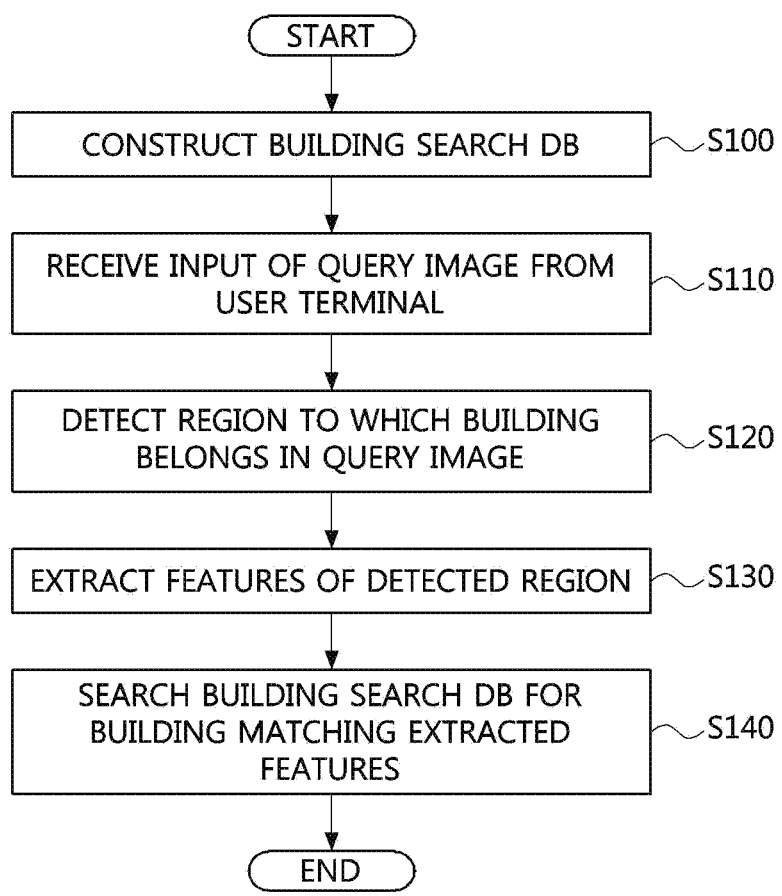
FIG. 7 is a flowchart of a method of searching for a building on the basis of an image according to an example embodiment of the present invention.
Figure 8:
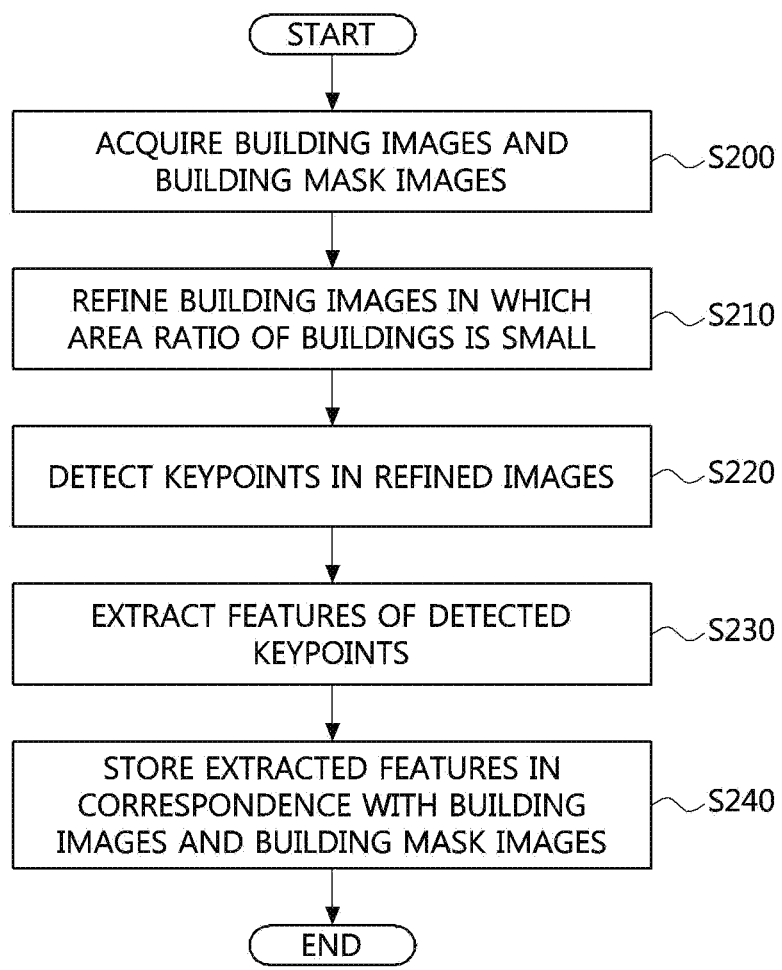
FIG. 8 is a flowchart of a method of constructing a building search DB for image-based building search according to an example embodiment of the present invention.

FIG. 7 is a flowchart of a method of searching for a building on the basis of an image according to an example embodiment of the present invention. FIG. 8 is a flowchart of a method of constructing a building search DB for image-based building search according to an example embodiment of the present invention.

First, referring to FIG. 7, a method of searching for a building on the basis of an image may include an operation of constructing a building search DB (S100), an operation of receiving a query image from a user terminal (S110), an operation of detecting a region to which a building belongs in the query image (S120), an operation of extracting features of the region detected in the query image (S130), and an operation of searching the building search DB for a building matching the extracted features (S140).

In the operation of detecting a region to which a building belongs (S120), the region to which the building belongs may be detected or segmented using a building detection model which is generated using acquired building images and building mask images as training images.

The operation of constructing a building search DB (S100) may be performed according to the flowchart of FIG. 8.

Referring to FIG. 8, the method of constructing a building search DB for image-based building search may include an operation of acquiring building images and building mask images (S200), an operation of refining the building images by deleting building images in which an area ratio of buildings is smaller than a reference value (S210), an operation of detecting keypoints in the refined images (S220), an operation of extracting features of the detected keypoints (S230), and an operation of storing the extracted features in correspondence with the building images and the building mask images (S240).

The operation of refining the building images (S210) may include an operation of calculating an area ratio of each individual building included in each of the building images using the building mask images, an operation of comparing the maximum of calculated area ratios of buildings with a preset threshold value, and an operation of deleting the building image in which area ratios have been calculated when a comparison result indicates that the maximum is smaller than the threshold value.

The operation of extracting features (S230) may include an operation of selecting keypoints overlapping the building mask images from among the detected keypoints and an operation of extracting features of the selected keypoints.

In the operation of selecting keypoints, keypoints whose preset surrounding regions overlap the building mask images may be selected from among the detected keypoints.

In the operation of extracting features, the selected keypoints may be classified according to individual buildings, and features may be extracted according to the individual buildings.

The operation of selecting keypoints may include an operation of selecting buildings whose area ratios in the building images exceed a preset threshold value and an operation of selecting keypoints whose surrounding regions overlap regions of the selected buildings in the building mask images.

Figure 9:
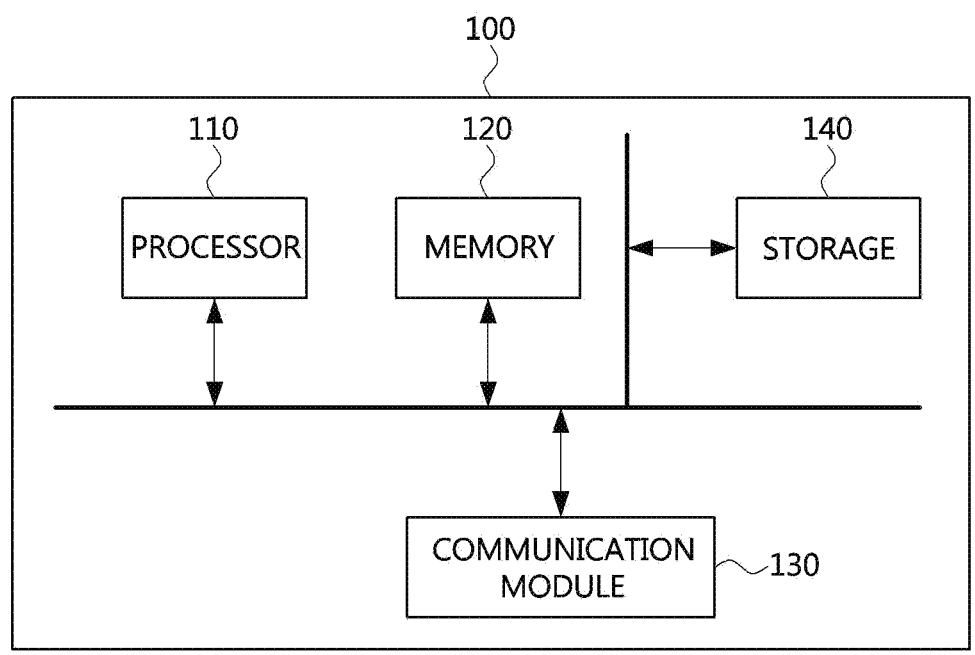
FIG. 9 is a block diagram of an apparatus for searching for a building on the basis of an image according to an example embodiment of the present invention.

FIG. 9 is a block diagram of an apparatus for searching for a building on the basis of an image according to an example embodiment of the present invention.

Referring to FIG. 9, an apparatus 100 for searching for a building on the basis of an image may include at least one processor 110 and a memory 120 for storing instructions which instruct the at least one processor 110 to perform at least one operation.

The apparatus 100 for searching for a building on the basis of an image may include a communication module 130 for receiving a query image or a query message including a query word from a user terminal owned or managed by a user and transmitting a search result to the user terminal via a wired or wireless network.

The apparatus 100 for searching for a building on the basis of an image may further include a storage 140 for temporarily or periodically storing and managing data of all or a part of a building search DB and storing intermediate data of a search process.

The at least one operation may include an operation of constructing a building search DB, an operation of receiving a query image from a user terminal, an operation of detecting a region to which a building belongs in the query image, an operation of extracting features of the region detected in the query image, and an operation of searching the building search DB for a building matching the extracted features.

In the operation of detecting a region to which a building belongs, the region to which the building belongs may be detected or segmented using a building detection model which is generated using acquired building images and building mask images as training images.

The operation of constructing a building search DB may include an operation of acquiring building images and building mask images, an operation of refining the building images by deleting building images in which an area ratio of buildings is smaller than a reference value, an operation of detecting keypoints in the refined images, an operation of extracting features of the detected keypoints, and an operation of storing the extracted features in correspondence with the building images and the building mask images.

The operation of refining the building images may include an operation of calculating an area ratio of each individual building included in each of the building images using the building mask images, an operation of comparing the maximum of calculated area ratios of buildings with a preset threshold value, and an operation of deleting the building image in which area ratios have been calculated when a comparison result indicates that the maximum is smaller than the threshold value.

The operation of extracting features may include an operation of selecting keypoints overlapping the building mask images from among the detected keypoints and an operation of extracting features of the selected keypoints.

In the operation of selecting keypoints, keypoints whose preset surrounding regions overlap the building mask images may be selected from among the detected keypoints.

In the operation of extracting features, the selected keypoints may be classified according to individual buildings, and features may be extracted according to the individual buildings.

The operation of selecting keypoints may include an operation of selecting buildings whose area ratios in the building images exceed a preset threshold value and an operation of selecting keypoints whose surrounding regions overlap regions of the selected buildings in the building mask images.

The apparatus 100 for searching for a building on the basis of an image may be, for example, a desktop computer, a laptop computer, a smart phone, a tablet personal computer (PC), a mobile phone, a smart watch, smart glasses, an e-book reader, a portable multimedia player (PMP), a portable game machine, a navigation device, a digital camera, a digital multimedia broadcasting (DMB) player, a digital audio recorder, a digital audio player, a digital video recorder, a digital video player, a personal digital assistant (PDA), etc. which are capable of communication.

With the above-described apparatus and method for searching for a building on the basis of an image according to the example embodiments of the present invention, it is possible to construct a DB in units of buildings from existing street-view images which are easily obtained. Therefore, search performance may be improved.

Also, a DB is refined by deleting images having regions unnecessary to search for a building. Therefore, search accuracy may be improved, and search speed may be increased.

While the example embodiments of the present invention and their advantages have been described in detail, it should be understood that various changes, substitutions and alterations may be made herein without departing from the scope of the invention.

What is claimed is:

1. A method of searching for a building based on an image, the method comprising:
    acquiring a building image and a building mask image corresponding to the building image based on a street-view image and a depth map of a search target region;
    refining the building image by deleting the building image when an area ratio of buildings in the building image is smaller than a predetermined reference value;
    detecting keypoints in a refined image;
    extracting features of detected keypoints;
    constructing a building search database (DB) by storing extracted features in correspondence with the building image and the building mask image;
    training a building detection model using a plurality of building images and building mask images;
    receiving a query image from a user terminal;
    detecting a building region in the query image;
    extracting features of the building region in the query image; and
    searching the building search DB for a building matching extracted features.

2. The method of claim 1, wherein the detecting the building region comprises detecting or segmenting the building region using the building detection model.

3. The method of claim 1, wherein the refining the building image comprises:
    calculating an area ratio of each individual building included in the building image using the building mask image;
    comparing a maximum of calculated building-specific area ratios with a preset threshold value; and
    deleting the building image without storing in the building search DB when the maximum is smaller than the threshold value.

4. The method of claim 1, wherein the extracting the features comprises:
    selecting keypoints overlapping a building in the building mask image from among the detected keypoints; and
    extracting the features of the selected keypoints.

5. The method of claim 4, wherein the selecting the keypoints comprises selecting keypoints whose preset surrounding regions overlap the building in the building mask image from among the detected keypoints.

6. The method of claim 4, wherein the extracting the features comprises classifying the selected keypoints according to individual buildings and extracting the features according to the individual buildings.

7. The method of claim 4, wherein the selecting the keypoints comprises:
    selecting buildings whose area ratios in the building image exceed a preset threshold value; and
    selecting keypoints whose surrounding regions overlap regions of the selected buildings in the building mask image.

8. A method of constructing a building search database (DB) for image-based building search, the method comprising:
    acquiring a building image and a building mask image corresponding to the building image based on a street-view image and a depth map of a search target region;
    refining the building image by deleting building image in which an area ratio of buildings in the building image is smaller than a predetermined reference value;
    detecting keypoints in a refined image;
    extracting features of the detected keypoints; and
    storing extracted features in correspondence with the building image and the building mask image.

9. The method of claim 8, wherein the refining the building image comprises:
    calculating an area ratio of each individual building included in the building image using the building mask image;
    comparing a maximum of the calculated area ratios of buildings with a preset threshold value; and
    deleting the building image without storing in the building search DB when the maximum is smaller than the threshold value.

10. The method of claim 8, wherein the extracting the features comprises:
    selecting keypoints overlapping a building in the building mask image from among the detected keypoints; and
    extracting the features of the selected keypoints.

11. The method of claim 10, wherein the selecting the keypoints comprises selecting keypoints whose preset surrounding regions overlap the building in the building mask image from among the detected keypoints.

12. The method of claim 10, wherein the extracting the features comprises classifying the selected keypoints according to individual buildings and extracting the features according to the individual buildings.

13. The method of claim 10, wherein the selecting the keypoints comprises:
    selecting buildings whose area ratios in the building image exceed a preset threshold value; and
    selecting keypoints whose surrounding regions overlap regions of the selected buildings in the building mask image.

14. An apparatus for searching for a building based on an image, the apparatus comprising:
    at least one processor; and
    a memory configured to store instructions for instructing the at least one processor to perform at least one operation,
    wherein the at least one operation comprises:
    acquiring a building image and a building mask image corresponding to the building image based on a street-view image and a depth map of a search target region;

refining the building image by deleting the building image when an area ratio of buildings in the building image is smaller than a predetermined reference value;
detecting keypoints in a refined image;
extracting features of detected keypoints;
constructing a building search database (DB) by storing extracted features in correspondence with the building image and the building mask image;
training a building detection model using a plurality of building images and building mask images;
receiving a query image from a user terminal;
detecting a building region in the query image;
extracting features of the building region in the query image; and
searching the building search DB for a building matching extracted features.

15. The apparatus of claim 14, wherein the detecting the building region comprises detecting or segmenting the building region using the building detection model.

16. The apparatus of claim 14, wherein the refining the building image comprises:
calculating an area ratio of each individual building included in the building image using the building mask image;
comparing a maximum of the calculated area ratios of buildings with a preset threshold value; and
deleting the building image without storing in the building search DB when the maximum is smaller than the threshold value.

17. The apparatus of claim 14, wherein the extracting the features comprises:
selecting keypoints overlapping a building in the building mask image from among the detected keypoints; and
extracting the features of the selected keypoints.

18. The apparatus of claim 17, wherein the selecting the keypoints comprises selecting keypoints whose preset surrounding regions overlap the building in the building mask image from among the detected keypoints.

* * * * *